July 28, 1925. 1,547,330
F. S. JONES
CONTROLLING MECHANISM
Original Filed May 19, 1923 3 Sheets-Sheet 1

July 28, 1925.

F. S. JONES

CONTROLLING MECHANISM

Original Filed May 19, 1923     3 Sheets-Sheet 3

1,547,330

Witnesses

George A. Gruss

Inventor
Frank S. Jones
By Joshua R. H. Potts
His Attorney

Patented July 28, 1925.

1,547,330

UNITED STATES PATENT OFFICE.

FRANK S. JONES, OF PHILADELPHIA, PENNSYLVANIA.

CONTROLLING MECHANISM.

Application filed May 19, 1923. Serial No. 640,122.

*To all whom it may concern:*

Be it known that I, FRANK S. JONES, a citizen of the United States, residing at Philadelphia, in the county of Philadelphia and State of Pennsylvania, have invented certain new and useful Improvements in Controlling Mechanism, of which the following is a specification.

My invention relates to controlling means for metal cutting machines particularly adapted for use on slotters for controlling the feed of the work table.

The object is to provide means whereby making an operative connection for moving the table laterally will disconnect the mechanism for rotating the table, and operatively connecting the mechanism for rotating the table will disconnect the mechanism for moving the table laterally, and which will be compact and within easy reach of the operator when in the usual position for controlling the movement of the work table.

This object, and other advantageous ends which will be described hereinafter, I attain in the following manner, reference being had to the accompanying drawings in which—

Figure 1:
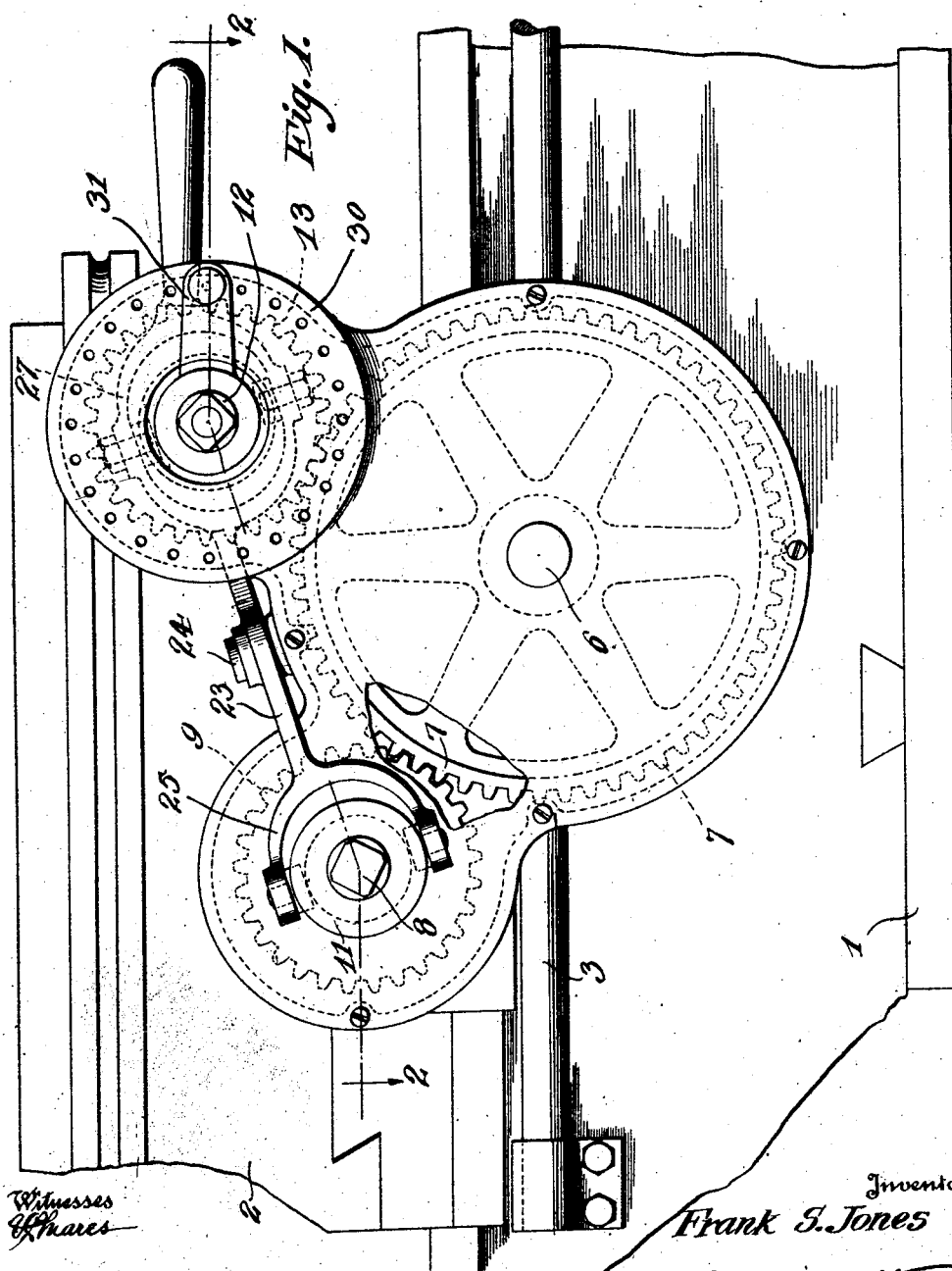
Figure 2:
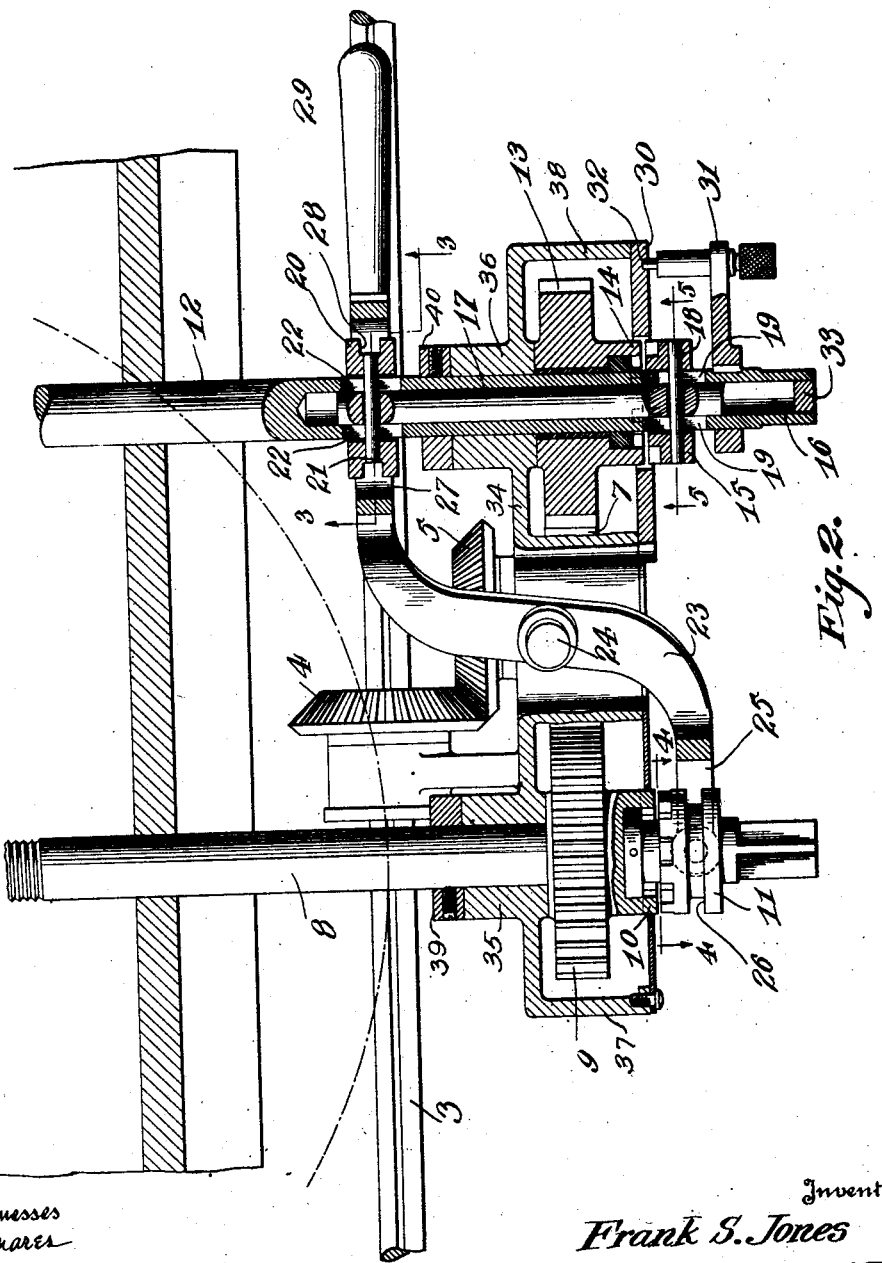
Figure 3:
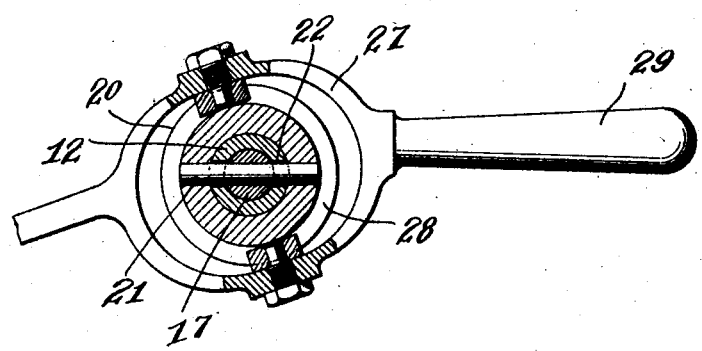
Figures 4, 5:
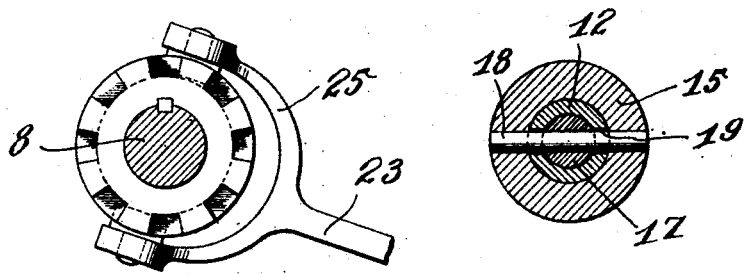

Figure 1 is a fragmentary side elevation of a slotter having my invention applied thereto, Figure 2 a section on line 2—2 of Figure 1, the work table being omitted for clearness of illustration, Figure 3 a section on line 3—3 of Figure 2, Figure 4 a section on line 4—4 of Figure 2, and Figure 5 a section on line 5—5 of Figure 2.

Referring to the drawings, a base 1 slidably supports a work table 2 which includes a cross slide and a circular table of any known construction. A feed shaft 3 is rotatably mounted on the base and has slidably keyed thereto a bevel gear 4 meshing with a bevel gear 5 carried by a shaft 6 on which is keyed a spur gear 7. A shaft 8 for moving the cross slide is rotatably mounted in the work table and has rotatably mounted thereon a spur gear 9 which meshes with spur gear 7. Gear 9 is provided with a clutch face 10 adapted to be engaged by a clutch collar 11 slidably keyed to shaft 8. A shaft 12 for imparting rotary movement to the circular table is rotatably mounted in the work table. A gear 13, rotatably mounted on shaft 12, is provided with a clutch face 14 adapted to be engaged by a clutch collar 15 slidably mounted on shaft 12. A bore 16 is provided in shaft 12 for receiving a bar 17 adapted to be secured at one end to clutch collar 15 by a pin 18 which extends from the clutch collar to the bar through a pair of slots 19 in shaft 12. A grooved collar 20 is secured to the other end of bar 17 by a pin 21 which extends from the grooved collar to the bar through a pair of slots 22 in shaft 12. A lever 23 is pivoted at 24 and has one end provided with a yoke 25 which engages a groove 26 in clutch collar 11. The other end of the lever is provided with a yoke 27 adapted to engage a groove 28 in collar 20. A handle 29 is fixed to the yoke for moving the lever. An index plate 30 is provided as is usual in slotters of this type. An indexing arm 31 is keyed to shaft 12 and has the usual spring-pressed pin 32 mounted in its end. The ends of the shafts 8 and 12 are made angular to receive a crank handle for manually turning them. Shaft 12 has its bore closed by any suitable means as shown at 33.

In the form shown, a bracket 34, integral with or fixed to the work table, is provided with collars 35 and 36, which serve as one bearing for shafts 8 and 12, and carries hoods 37 and 38 enclosing gears 9 and 13. The shaft may be held against endwise movement by thrust collars 39 and 40. Lever 23 is pivoted at 24 to bracket 34.

To use my controlling means to operatively connect shaft 12 to gear 13, handle 29 is moved to cause clutch collar 15 to engage clutch face 14 on gear 13. During this movement, clutch collar 11 will move away from clutch face 10 on gear 9. Thus a rotary movement will be imparted to shaft 12 from gear 13. When it is desired to connect shaft 8 to gear 9, handle 29 is moved in the opposite direction to cause clutch collar 11 to engage clutch face 10. During this movement clutch collar 15 will be moved away from clutch face 14, thus operatively connecting shaft 8 to gear 9 and disconnecting shaft 12 from gear 13. It will be understood that while shaft 12 is rotating, spring-pressed pin 32 will be held out of engagement from index plate 30.

By providing a controlling means as above described the number of parts projecting from the machine is reduced and the operator may very conveniently control the movement of the work table, the controlling lever being within easy reach when watching the metal as it is worked on the table.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A machine of the character described including a pair of parallel shafts; a gear rotatable on each shaft, the gears having clutch faces on the same side; a clutch collar on each shaft; a bent lever extending between the peripheral faces of the gears and having one arm adapted to engage and actuate the clutch collar on one shaft, and a connection between the other arm of the lever and the clutch collar on the other shaft whereby actuation of the lever will move the two clutch collars in reverse direction.

2. A machine of the character described including a pair of parallel shafts, one of the shafts having a bore; a clutch faced gear rotatable on each of the shafts; a clutch collar on each shaft at one side of each gear; a bar movable in the bore and operatively connected to one clutch collar, and a pivoted lever having one end connected to the other clutch collar and the other end extending to the other side of the gears, and operatively connected to the bar.

3. A machine of the character described including a pair of parallel shafts, one of the shafts having a bore; a clutch faced gear rotatable on each shaft; a clutch collar on each shaft disposed at one side of each gear; a bar movable in the bore having one end operatively connected to one clutch collar, and a pivoted lever having one end connected to the other clutch collar and the other end extending to the other side of the gears, and operatively connected to the other end of the bar.

4. A machine of the character described including a pair of parallel shafts, one of the shafts having a bore; a clutch faced gear rotatable on each shaft, a clutch collar on each shaft disposed at one side of each gear; a bar movable in the bore and having one end operatively connected to one clutch collar; a grooved collar slidable on the shaft and operatively connected to the bar, and a pivoted lever having one end connected to the other clutch collar and the other end extending to the other side of the gears and operatively connected to the grooved collar.

5. A machine of the character described including a pair of parallel shafts, one of the shafts having a bore and being provided with pairs of slots; a clutch faced gear rotatable on each shaft; a clutch collar on each shaft disposed at one side of each gear; a bar movable in the bore; a pin extending through one pair of slots and connecting the bar to one clutch collar; a grooved collar slidable on the bore shaft; a pin extending through the other pair of slots and connecting the bar to the grooved collar, and a pivoted lever having one end connected to the other clutch collar and the other end extending to the other side of the gears and operatively connected to the grooved collar.

In testimony whereof I have signed my name to this specification in the presence of two subscribing witnesses.

FRANK S. JONES.

Witnesses:
JOHN ALLAN,
RAYMOND S. ERB.